United States Patent [19]

Dändliker

[11] Patent Number: 4,563,091

[45] Date of Patent: Jan. 7, 1986

[54] METHOD FOR IDENTIFYING AN OBJECT AND MEASURING ITS POSITION AND ORIENTATION, AND DEVICE FOR CARRYING OUT THE METHOD

[75] Inventor: René Dändliker, Corcelles, Switzerland

[73] Assignee: Gretag AG, Regensdorf, Switzerland

[21] Appl. No.: 393,261

[22] Filed: Jun. 29, 1982

[30] Foreign Application Priority Data

Jun. 30, 1981 [FR] France .................. 81 13002

[51] Int. Cl.$^4$ ............................................. G01B 9/02
[52] U.S. Cl. ................................. 356/349; 356/354; 356/359; 356/363
[58] Field of Search ............... 356/349, 354, 359, 360, 356/363; 350/162.12, 162.13

[56] References Cited

U.S. PATENT DOCUMENTS

| | | | |
|---|---|---|---|
| 4,111,526 | 9/1978 | Joseph | 350/162.13 |
| 4,150,360 | 4/1979 | Kopp et al. | 350/162.12 X |
| 4,174,179 | 11/1979 | Tschudi et al. | 356/71 |
| 4,207,002 | 6/1980 | Gara et al. | 356/375 |
| 4,213,704 | 7/1980 | Burns et al. | 356/349 |

OTHER PUBLICATIONS

Lewis, "Real-Time Coherent Optical Edge Enhancement", *Applied Optics*, vol. 17, No. 2, pp. 161–162, Jan. 1978.

*Primary Examiner*—Davis L. Willis
*Assistant Examiner*—Matthew W. Koren
*Attorney, Agent, or Firm*—Pollock, Vande Sande & Priddy

[57] ABSTRACT

The method comprises producing a coherent light beam in which the distribution of luminous intensity is representative of the object under study, forming an image representing the complex Fourier spectrum of the function describing said distribution of luminous intensity, and producing first data in response to the luminous intensity in a part of said image and second data in response to the relative phase of the light waves producing said image. The first data are representative of the object and of its orientation and the second data are representative of the position of the object.

18 Claims, 5 Drawing Figures

METHOD FOR IDENTIFYING AN OBJECT AND MEASURING ITS POSITION AND ORIENTATION, AND DEVICE FOR CARRYING OUT THE METHOD

BACKGROUND OF THE INVENTION

The present invention relates to method for identifying an object and measuring its position and its orientation, and to a device for carrying out the method.

The problem of identifying an object and measuring its position and its orientation arises in many technical arts, for example in designing machines which are capable of automatically assembling the various components of a mechanical, electrical, or other, assembly or subassembly. Such machines are often referred to as industrial robots.

Devices for overcoming that problem have already been proposed. French patent application No. 2 405 517 for example describes a device comprising a memory for storing data provided by a television camera directed onto the object to be identified. The data stored in the memory are analysed by electronic means for determining the position of the centroid of the image representing the object, and for producing an electrical signal which is characteristic of the shape of the object. The electrical signal is then compared to a certain number of signals which have been stored during a learning phase and which are characteristic of one of the types of objects which may be presented before the device. The result of the comparison operation makes it possible to identify the object being examined, and to determine its angular position with respect to a reference position.

This device suffers from the disadvantage of being slow, because of the considerable number of data that it is required to process. The distortion phenomena introduced by the television camera may also result in errors of object identification and positional measurement.

Other devices described for example in U.S. Pat. No. 4,207,002 measure the correlation between an image which is representative of the Fourier spectrum of the object being examined and the Fourier spectrum of a reference object which is recorded in the form of a hologram. Good correlation indicates that the object being examined is identical to the reference object. The position of the correlation peak in the measuring plane also gives information relating to the position of the object in question.

In comparison with the first described device, this device has the great advantage of parallel processing of all the data which are representative of the object being examined, and is therefore very quick.

However, this device suffers from the disadvantage of being highly sensitive to the angular position of the object being examined. If that position is not identical to the position of the reference object which was used to produce the hologram, the height or the intensity of the correlation peak is reduced and the peak may even disappear.

This disadvantage can be overcome by means of an accessory device which is described for example in U.S. Pat. No. 4,174,885, which rotates the reference hologram. However, this accessory device seriously complicates the design of the recognition device and reduces its operation speed.

In addition, such device permits recognition of only a single type of object at a time. If a number of types of objects of different shapes are to be recognised, a plurality of devices must be provided, each being equipped with the hologram corresponding to one of those types of object.

SUMMARY OF THE INVENTION

One of the main purposes of the invention is to provide a method for identifying an object and measuring its position and its orientation which overcomes all the disadvantages of the above described known methods.

The method of the present invention comprises the steps of producing a first coherent light beam at a first frequency in which the distribution of luminous intensity is representative of the object under examination, forming at least a first image representative of the complex Fourier spectrum of the function describing the distribution of luminous intensity in the first beam, producing first data in response to the luminous intensity in at least a part of said first image, and producing second data in response to the phase of the light waves producing said first image. The first data is representative of the object and of its orientation, and the second data is representative of its position.

Another purpose of the invention is to provide a device for carrying out this method.

BRIEF DESCRIPTION OF THE DRAWINGS

The invention will now be described in greater detail, with reference to the drawings in which.

DESCRIPTION OF THE PREFERRED EMBODIMENTS

Figure 1:
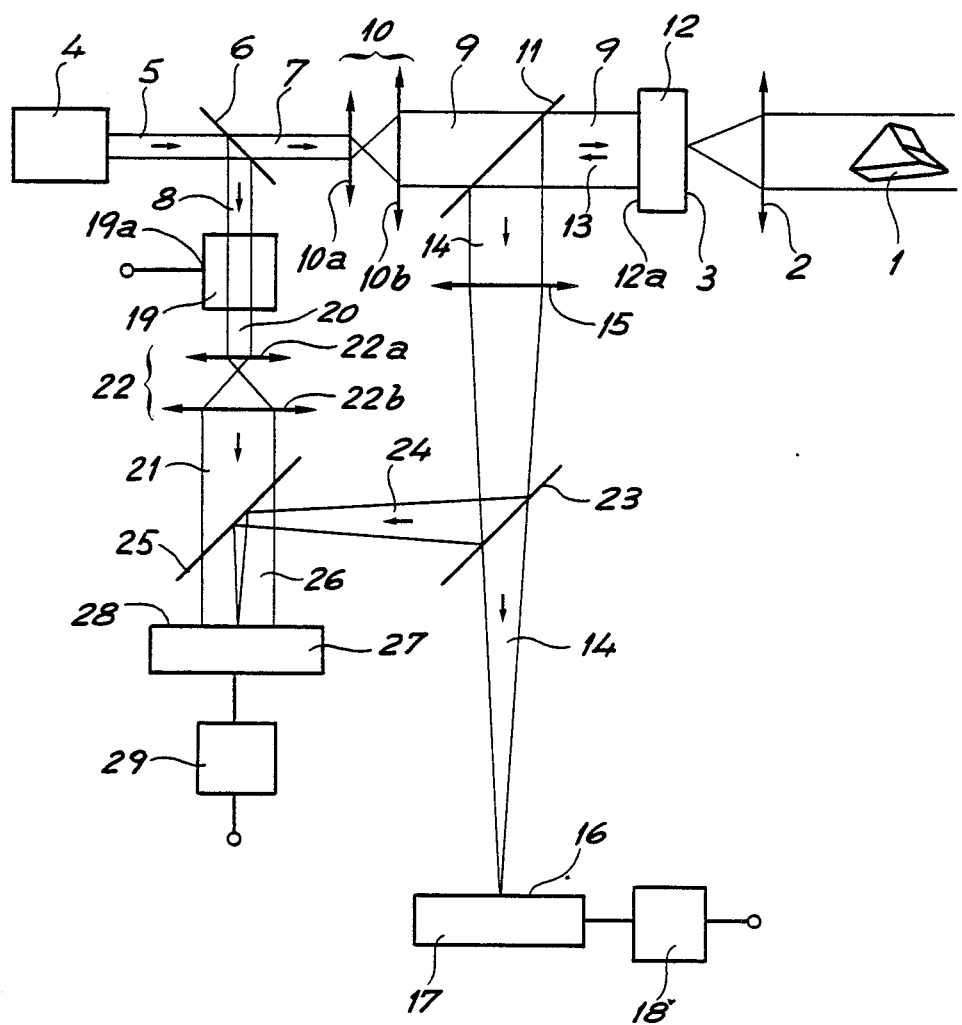
FIG. 1 is a schematic view of an embodiment of the device of the invention.

In the embodiment shown in FIG. 1, the objects which are to be identified and the position and orientation of which are to be measured, an example of which is indicated by reference numeral 1, are passed one by one in front of the device, by means of a conveyor belt or any other conveyor means (not shown).

A converging lens 2 which is disposed at a given distance from the conveyor belt forms an image of the object in the plane 3 which is the conjugate plane of the plane of the conveyor belt with respect to the lens 2.

A laser 4 produces a beam 5 of coherent light. It should be noted that the arrow illustrated in the beam 5, like the other arrows illustrated in the other beams which will be referred to hereinafter, simply designates the direction of propagation of the beam.

A beam splitter 6 divides the beam 5 into two partial beams 7 and 8. The beam 7 is enlarged by an optical system 10 comprising two convergent lenses 10a and 10b to form a beam 9.

The beam 9 passes through a second beam splitter 11 and arrives at a first face 12a of an incoherent-coherent converter 12, the second face of which is disposed in the plane 3.

Such converters are known, in particular from the record of the report by Messrs. J. Grinberg et al to the International Conference on the Applications of Holography and Optical Processing of Information, held in Jerusalem from 23rd to 26th August 1976 (edited by Messrs. E. Marom et al, Pergamon Press, Oxford).

Such converters will not be described in detail herein. It is sufficient to know that the converter 12 converts the incident beam 9 into a reflected beam 13 and that the intensity of the coherent light reflected at each point on the face 12a of the converter 12 or each point of any section of the beam 13 depends on the intensity of the non-coherent light at the corresponding point in the plane 3. The distribution of luminous intensity in the beam 13 is therefore representative of the object 1.

The beam 13 which in FIG. 1 merges with the incident beam 9 is reflected by the splitter 11 to form a beam 14. A convergent lens 15 which is disposed on the path of the beam 14 forms, in its focal plane 16, an image which results from interference of all the elementary waves forming the beam 14.

The result of coherent optics shows that the function which describes the distribution of luminous intensity in the plane 16 is the complex Fourier transform of the distribution of luminous intensity in the plane 12a. In other words, the image formed in the plane 16 is a representation of the Fourier spectrum of the distribution of luminous intensity in the plane 12a and thus of the object 1.

The position of the Fourier spectrum in the plane 16 is independent of the position of the object 1 in front of the lens 2. The spectrum always has a light spot at the focus of the optical system 15. The luminous intensity in that spot is proportional to the coefficient of the zero frequency term in the Fourier transform or, in other words, to the continuous component of the function describing the distribution of luminous intensity in the plane 12a.

On the other hand, the orientation of the Fourier spectrum in the plane 16 depends on the orientation of the object 1. If the object 1 is turned through a certain angle, the Fourier spectrum turns through an equal angle.

A photoelectric detector 17 is so positioned that the sensitive surface thereof is in the plane 16. It comprises a series of photoelectric cells disposed in a circle around the focus of the optical system 15. The electrical signals produced by the photoelectric cells therefore present a reduced sample of the enormous amount of data available in the Fourier spectrum.

The number of cells forming the detector 17 must be sufficiently large for the sample actually to be characteristic of the Fourier spectrum and thus of the object being examined. However, the number of cells must not be too high as the time required for processing the signals produced by the cells would then be excessive.

The information supplied by the detector 17 is increasingly characteristic of the object under examination, in proportion to an increasing diameter of the circle formed by the photoelectric cells. However, as the luminous intensity in the Fourier spectrum generally decreases when the distance to the centre increases, the diameter of the circle formed by the cells mut not be excessively large. The signals supplied by the cells could then become too weak, which would complicate subsequent processing thereof.

The measuring signals produced by the detector 17 are compared in an electronic circuit 18 to reference signals which have been stored in a memory during a preliminary learning stage.

In the learning stage, an object of each type of objects that the device is intended to recognise is placed in a defined position and orientation, in front of the lens 2. For each object, the plurality of signals supplied by the detector 17 is stored in a particular memory which forms part of the circuit 18, to serve as reference signals when the device is in use.

It should be emphasised that the device recongnises three-dimensional objects only by their two-dimensional image which is formed in the plane 3. If an object may have two or more different images, depending on the face on which it rests on the conveyor belt, the reference signals supplied in each case during the learning phase by the detector 17 must be stored in different memories. This arrangement is highly suitable for the desired objective, as the robot which uses the information supplied by the device must obviously handle such an object differently, depending on the face on which it rests.

In use of the device, the group of measuring signals supplied by the detector 17 is first introduced into a shift register and then cyclically shifted in the register to simulate rotation of the detector 17 in the plane 16 or of the object 1 on the conveyor belt. In each step of that shift, the group of measuring signals is successively compared to each of the groups of reference signals. The comparison operation can be performed by calculating, in each step, the correlation which exists between the group of measuring signals and each group of reference signals.

Finally, the circuit 18 determines which one of all those successive comparison operations gave the best result. The group of reference signals in respect of which the maximum result was obtained indicates the type of object to which the object being examined belongs, and the number of shifts of the measuring signals in the shift register which had to be performed in order to arrive at that maximum result indicates the orientation of the object under examination, with respect to the orientation that the corresponding object had during the learning stage.

If none of the successive comparison operations gives a result which is better than a predetermined minimum result, the object under examination is considered as not being one of the objects which can be used by the robot.

The means described hereinbefore permit the computer which controls the robot associated with the device to be supplied with information representing the type of the object under examination and the orientation thereof. Information concerning the position of the object under examination is also present in the Fourier spectrum which is formed in the plane 16, in the form of the relative phase of the different elementary waves forming the beam 14. The frequency of the light however is too high to permit that phase to be measured directly. This difficulty is overcome by the means which will be described hereinafter and which are also shown in FIG. 1.

These means comprise a frequency converting device 19 which is disposed on the path of the beam 8 and which is intended to produce a beam 20 of coherent light at a frequency different from that of the beam 14. Such devices which may comprise for example in acoustic-optical modulator are known and will not be described herein. It is sufficient to be aware that the difference between the frequency of the beam 20 and the frequency of the beam 14 is determined by the frequency of a control signal which is applied to the input 19a of the device 19 by means which are not shown in the drawing. In practice, the above-mentioned difference may be from a few kilohertz to some hundreds of kilohertz.

The beam 20 issuing from the device 19 is enlarged by an optical system 22 comprising two lenses 22a and 22b to form a beam 21 of the section of which is substantially equal to the section of the beam 14.

A third beam splitter 23 which is disposed between the lens 15 and the plane 16 directs a part 24 of the beam 14 towards a fourth beam splitter 25 which in turn is disposed on the path of the beam 21.

The beam 26 formed by the combination of the beam 21 and the beam 24 falls onto a second photoelectric detector 27, the sensitive portion of which is disposed in a plane 28.

The detector 27 and the beam splitters 23 and 25 are so positioned that the length of the optical path between the lens 15 and the plane 28 is equal to the focal distance of the lens 15. Without the beam 21, the image formed in the plane 28 by the beam 24 would therefore be similar to the image of the Fourier spectrum formed in the plane 16.

However, interference of the beams 21 and 24 causes a system of interference fringes to appear in the plane 28, being superimposed on the Fourier spectrum. In the central spot of the Fourier spectrum, the interference fringes are substantially parallel to each other and are moving perpendicularly to their general direction at a speed which depends only on the difference between the frequencies of the beams 21 and 24 and therefore on the known frequency of the control signal of the device 19.

The position of the image of the object in the plane 12a and therefore the position of the object 1 can be determined by measuring the distance between the fringes and the direction of displacement thereof.

Figure 2:
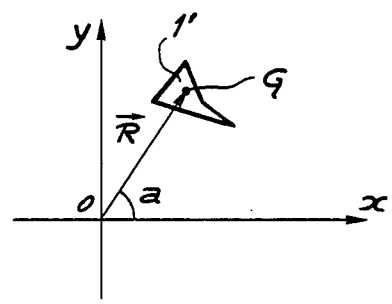
FIG. 2 shows a way of representing the position of the object.

For the purpose, it is necessary to define a system of perpendicular axes xOy in the plane 12a, the origin O preferably being selected at the point in the plane 12a which is on the optical axis of the lens 2. The direction and the sense of the axes Ox and Oy may be a matter of random selection. FIG. 2 shows the plane 12a with such a system of axes and, by way of example, the image 1' of an object 1. The centroid of the image 1' is indicated by reference G.

A system of axes uO'v in the the plane 28 must then be selected such that the origin O' thereof is at the focus of the lens 15 and the axes O'u and O'v are perpendicular to the fringes when the centre of gravity G of the image 1' of the object in the plane 12a is on the axis Ox and the axis Oy respectively. The positive sense of the axes O'u and O'v is defined as being the direction of displacement of the fringes when the centre of gravity G is on the positive part of the axis Ox and Oy respectively.

Figure 3:
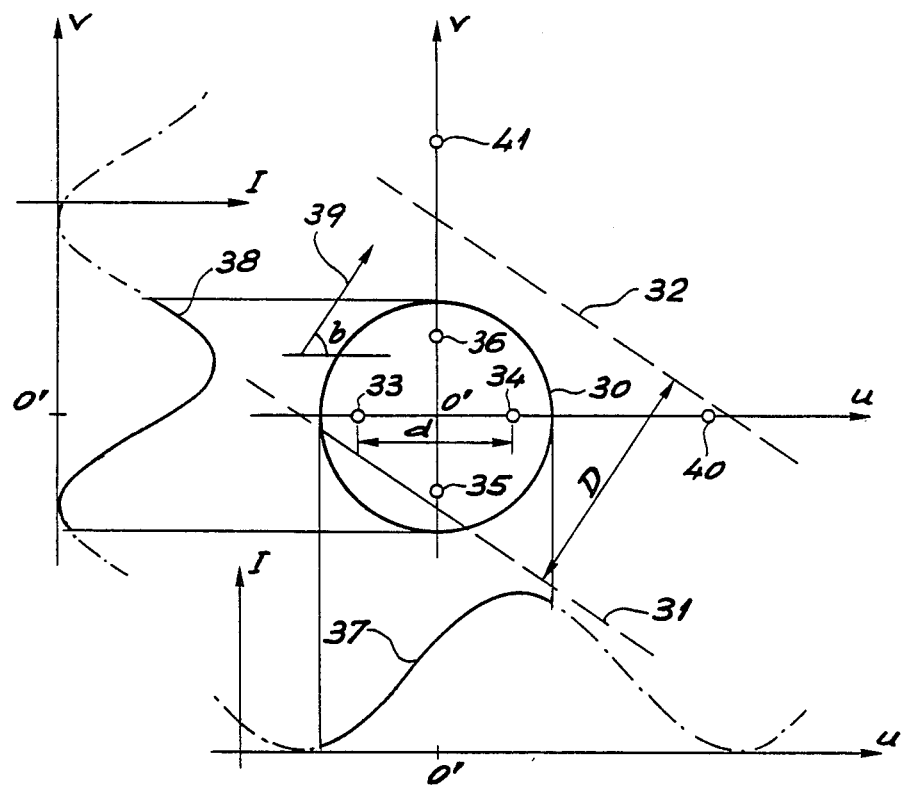
FIG. 3 shows a way of determining the position of the object.

FIG. 3 is a diagrammatic view of the image in the plane 28 corresponding to the situation illustrated in FIG. 2. The circle 30 represents the limit of the central spot of the Fourier spectrum. The straight lines 31 and 32 represent two successive minima in respect of the luminous intensity of the fringes, at the position that they would occupy at a given instant if the phase of the light waves was not dependent, outside the central spot, on the shape of the object. The real composite image of the Fourier spectrum and the interference fringes is not shown outside the central spot in FIG. 3.

The theory of coherent optics shows that the direction of displacement of the fringes in the system of axes uO'v which is also shown in FIG. 3 are identical to the direction of the vector $\vec{R}$ which in the plane 12a joins the origin O of the system xOy to the centroid G of the image 1' of the object 1 (see FIG. 2). The angle a in FIG. 2 is therefore equal to the angle b in FIG. 3. Theoretical considerations also show that the pitch of the fringes in the plane 28, that is to say, the distance D which separates for example the straight lines 31 and 32 in FIG. 3 is inversely proportional to the length of the above-defined vector $\vec{R}$, that is to say, the distance between the centroid G of the image 1' and the origin O.

Therefore, measuring that distance D and the angle formed by the fringes to the axis O'u for example, or the angle b, makes it possible to calculate the coordinates of the centroid G of the image 1' of the object in the plane 12a.

In order to make such measurements, the detector 27 is formed for example by four photoelectric cells. Two of those cells, which are denoted by references 33 and 34 in FIG. 3, are disposed on the axis O'u, on respective sides of the origin O'. The other two cells which are indicated by references 35 and 36 are disposed on the axis O'v, also on respective sides of the origin O'.

The curves 37 and 38 in FIG. 3 illustrate the sinusoidal variation in luminous intensity 1 along the axes O'u and O'v at the moment shown. Only the part of the curves illustrating that variation within the circle 30 is of real significance. The remainder of the curves is theoretical, for the reasons indicated hereinbefore.

As the interference fringes move in the direction indicated by arrow 39, at a speed which depends only on the difference between the frequencies of the beams 20 and 24, the electrical signals produced by the cells 33 to 36 vary in time at a frequency which is equal to the above-mentioned frequency difference.

It can be easily shown that, if the distance d between the cells 33 and 34 is equal to the distance between the cells 35 and 36, the angle b is given by the following relationship:

$$\tan b = P2/P1$$

and the distance D is given by the following relationship:

$$D = d 2\pi (P1^2 + P2^2)^{-\frac{1}{2}}$$

in which:
P1 is the phase difference of the signals produced by the cells 33 and 34, as measured in radians; and
P2 is the phase difference of the signals produced by the cells 35 and 36, also measured in radians.

It should be noted that it would be possible for the same measurements to be made by means of only three cells. Two of those three cells would be disposed for example at the same locations as the cells 34 and 36, and the third cell would be disposed at the origin O' of the system uO'v.

The above-indicated measurements of the relative phases P1 and P2 therefore make it possible to calculate the orientation and the magnitude of the vector $\vec{R}$ in the plane 12a, which gives the computer controlling the robot the required information concerning the position of the object.

In order for the phase measurements to be unequivocal, the distance d between the cells 33 and 34 or 35 and 36 must be less than the minimum possible distance between two fringes. That minimum distance is attained when the image of the object is at the outside edge of the face 12a of the converter 12. That minimum distance also depends on the wavelength of the beam produced by the laser 4, and the focal length of the lens 15.

In practice, the cells must not be spaced at more than a few millimeters, which can cause certain difficulties in regard to fitting thereof. Such difficulties are overcome for example by using optical fibres to detect the light in the plane 28 at the desired locations, and to carry that light to the cells which are disposed at a different, more convenient position.

In addition, the above described phase measurements become more inaccurate, in proportion to decreasing distance between the cells. This problem can be overcome by providing a third cell on each of the axes O'u and O'v, said third cell being disposed at a markedly greater distance from the origin O'. Those additional cells are indicated by references 40 and 41 in FIG. 3.

The phase measurements can then be made in two successive stages. The first measurement, which is relatively inaccurate, is performed with the cells 33 and 34 on the one hand and 35 and 36 on the other hand. This first measurement is essential for unequivocally determining the direction of displacement of the fringes. The second measurement which gives a more accurate result than the first measurement is performed using the signals produced by the cells 33 for example and 40 on the one hand and 35 for example and 41 on the other hand.

However, the second measurement must be corrected, taking into account the fact that, outside the central spot of the Fourier spectrum, the measured phase includes a term which depends on the object being examined and the orientation thereof. It is therefore necessary for the second measurement also to be made during the above-described learning stage, and for the values measured in respect of a plurality of orientations of each type of object to be stored in the circuit 29, while obviously leaving the centroid G of its image at the origin of the system xOy. In use of the device, the data supplied by the circuit 18 concerning the type of object under examination and the orientation thereof are used by the circuit 29 to select one of the stored values and consequentially correct the second phase measurement.

Determining the position of the object in two stages, the first of which quickly gives a result which is still not accurate while the second then gives an accurate result, is highly suitable for controlling robots. In fact, robots must be set in operation as quickly as possible. However, at the beginning of their movement, they require only relatively inaccurate information concerning the position of the object to which they are to move. The precise information that they need to conclude their movement can be very easily determined while they are moving.

In determining the type of object under examination and the orientation thereof, as described above, the same line of reasoning results in only a part of the measuring signals produced by the detector 17 being processed in a first stage. The first stage therefore comprises a reduced number of comparison operations, which are relatively slow operations. The result provided by the first stage is still inaccurate, but it permits elimination of some of the types of objects. It also makes it possible to determine the approximate orientation of the object under examination with respect to each of types of objects which have not been eliminated.

In a second stage, the group of measuring signals produced by the detector 17 is processed in the above-described manner, but the comparison operations are performed only in relation to the reference signals corresponding to the types of objects which have not been eliminated in the first stage. Those comparison operations are also performed only in respect of some orientations which are around the approximate orientation as determined in the first stage. The total number of comparison operations to be carried out in the two stages is therefore much lower than the number of comparison operations which are to be performed if there is only a single stage.

It is obviously possible to provide more than two stages in the operation of determining the type of object under examination, and the orientation thereof.

The image representing the Fourier spectrum corresponding to the object under examination is also formed in the plane 28. It is therefore possible for a detector formed by the combination of detectors 17 and 27 as described hereinbefore, to be located at that position. The detector 17 shown in FIG. 1 could then be omitted and the circuit 18 could be combined with the circuit 29. Likewise, the splitter 23 could be replaced by a mirror.

Figure 4:
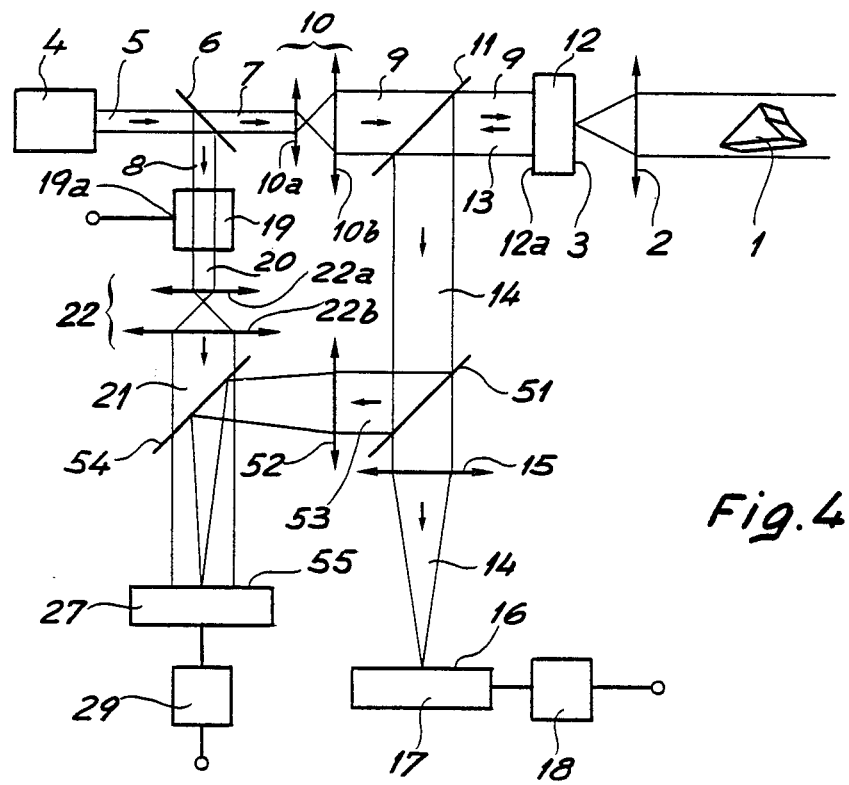
FIG. 4 is a schematic view of a second embodiment of the device of the invention.

FIG. 4 illustrates another embodiment of the device. The components of this embodiment which are identical to the corresponding components of the embodiment described with reference to FIG. 1 are denoted by the same reference numerals.

In this embodiment, a beam splitter 51 is disposed between the splitter 11 and the lens 15, and a convergent lens 52 is disposed on the path of the beam 53 which is reflected by the splitter 51. The beam 53 is then combined with a beam 21 which is identical to the beam 21 in FIG. 1, by a beam splitter 54, to form, in the focal plane 55 of the lens 52, an image which is similar to the image formed in the plane 28 in FIG. 1. The data contained in that image are than processed in the above-described manner.

In this embodiment, the focal lengths of the lenses 15 and 52 may be different, which permits the images formed in the planes 16 and 55 to be of dimensions which are also different and which are adapted to the dimensions of the detectors 17 and 27.

Figure 5:
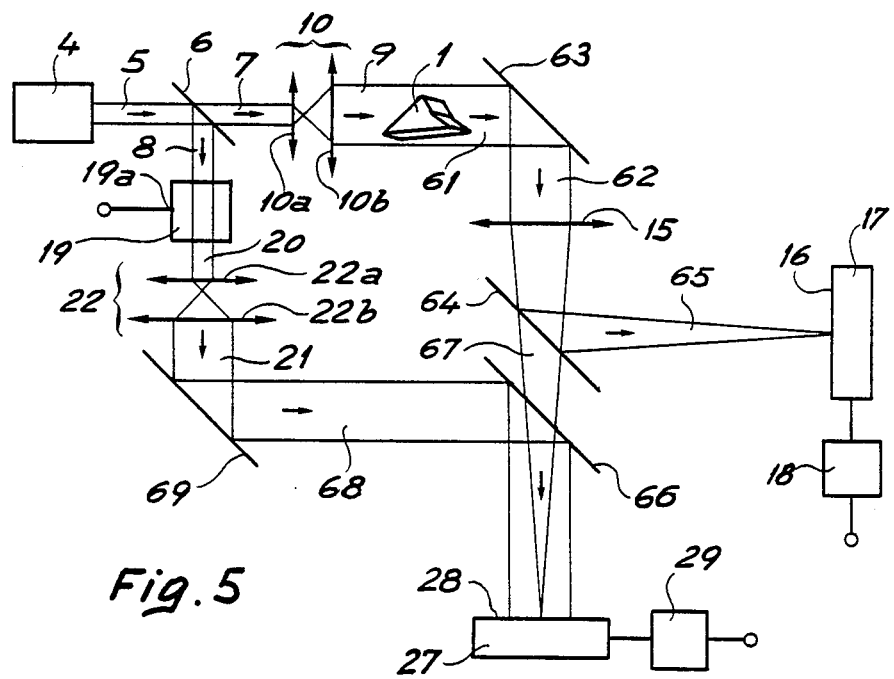
FIG. 5 is a schematic view of a third embodiment of the device of the invention.

In the embodiment illustrated in FIG. 5, the object 1 being examined is illuminated directly by the beam 9 formed by the optical system 10 from the beam 5 produced by the laser 4. All those components, and all the components which are denoted by the same references as those used in FIG. 1, are identical to the corresponding components described with reference to FIG. 1. It will be appreciated that in this case the object 1 must be carried by a transparent conveyor belt.

Partial masking of the beam 9 by the object 1 produces a beam 61 in which the distribution in respect of luminous intensity obviously depends on the object 1.

The lens 15 is disposed in the path of the beam 62 formed by reflection of the beam 61 at a mirror 63. A beam splitter 64 is disposed in the path of the beam 62, downstream of the lens 15, so that a part 65 of the beam 62 is directed towards the detector 17. The splitter 64 and the detector 17 are so disposed that the optical distance between the lens 15 and the plane 16 is equal to the focal length of the lens 15.

The image formed in the plane 16 is therefore entirely similar to that described above with reference to FIG. 1. The data that the image contains, relating to the nature and orientation of the object 1, can be processed by the detector 17 and the circuit 18, precisely as described in relation to FIG. 1.

Another beam splitter 66 is disposed in the path of the part 67 of the beam 62, which passed through the splitter 64. The splitter 66 performs the same function as the splitter 25 in FIG. 1, by combining the beam 67 with a reference beam 68 produced by reflection of the beam 21 at a mirror 69. It will be appreciated that the detector 27 is positioned in such a way that the focus of the lens 15 is in the plane 28.

The image formed in the plane 28 is therefore entirely similar to that described above with reference to FIG. 1. The data that the image contains, relating to the position of the object 1, may be processed by detector 27 and the circuit 29, precisely as described above with reference to FIG. 1.

It will be apparent that the above-described Figures are only diagrammatic views of some embodiments of the invention. Other arrangements in respect of the different components may be employed, without thereby departing from the scope of the invention. In addition, other beam splitters, other mirrors and/or lenses may be required to form or direct the different beams in a manner compatible with the actual arrangement of the components such as the laser, the object conveyor apparatus, the frequency converting device, the photoelectric detectors and the incoherent-coherent converter. In particular it is desirable for the different components to be so arranged that the lengths of the different optical paths between the laser and the photoelectric detectors are substantially equal. The disadvantages which could result from possible variations in the coherence of the laser beam in respect of time can thus be overcome.

It is also apparent that the different lenses described hereinbefore may be replaced by more complicated optical systems which are so arranged as to suppress the aberration phenomena which are generally caused by simple lenses.

Finally, it is also apparent that the functions performed by the data processing circuits 18, 29, 72 and 73 may be at least partially replaced by functions performed by the computer controlling the robot which is associated with the device.

It will be appreciated that the present invention is not limited just to the embodiments described herein, but that the scope of the present patent also extends to alternatives in respect of all or part of the arrangements described, which are still within the range of equivalences, and to any application of such arrangements.

What is claimed is:

1. A method for identifying an object and measuring its position and its orientation, comprising the steps of:
    producing a first uniform beam of coherent light at a first frequency;
    producing a modulated beam representative of shape, orientation and position of said object by spatially modulating said first uniform beam in response to said object;
    causing said modulated beam to form a first converging beam having a first plane of convergence;
    producing first data in response to luminous intensity in at least a part of said first plane of convergence;
    causing said modulated beam to form a second converging beam having a second plane of convergence;
    producing a second uniform beam of coherent light at a second frequency different from said first frequency;
    causing said second converging beam to interfere with said second uniform beam in said second plane of convergence; and
    producing second data in response to variation of light intensity in at least a part of said second plane of convergence;
    whereby said first data is representative of the shape and the orientation of said object, and said second data is representative of the position of said object.

2. The method of claim 1 wherein said first converging beam is merged with said second converging beam and is also caused to interfere with said second uniform beam, and said first plane of convergence is merged with said second plane of convergence.

3. A device for identifying an object and measuring its position and its orientation, comprising:
    means for producing a first uniform beam of coherent light at a first frequency;
    means for producing a modulated beam representative of shape, orientation and position of said object by spatially modulating said first uniform beam in response to said object;
    means for converging said modulated beam to form a first converging beam having a first plane of convergence;
    means for producing first data in response to luminous intensity in at least a part of said first plane of convergence, whereby said first data is representative of the shape and orientation of said object;
    means for producing a second uniform beam of coherent light at a second frequency different from said first frequency;
    means for causing said modulated beam to form a second converging beam having a second plane of convergence;
    means for causing said second uniform beam to interfere with said second converging beam in said second plane of convergence; and
    means for producing second data in response to variation in luminous intensity in at least a part of said second plane of convergence, whereby said second data is representative of the position of said object.

4. The device of claim 3, wherein said means for producing a modulated beam comprises an incoherent-coherent converter, means for forming an image in incoherent light of said object on said converter, and means for directing said first uniform beam on said converter, whereby said converter produces said modulated beam.

5. The device of claim 3, wherein said means for producing a modulated beam comprises means for directing said first uniform beam on said object, said modulated beam being produced by the partial masking of said first beam by said object.

6. The device of claim 3, wherein said means for causing said modulated beam to form a first converging beam comprises a converging lens having a first focal point in said first plane of convergence.

7. The device of claim 6, wherein said means for producing first data comprises a first photoelectric detector disposed in said first plane of convergence and including a first plurality of photoelectric cells disposed at substantially equal distances from said first focal point for producing a first signal in response to said luminous intensity.

8. The device of claim 7, wherein said means for producing first data further comprises:
means for storing at least one reference signal;
means for storing said first signal; and
means for measuring a correlation between said reference signal and said stored first signal.

9. The device of claim 6, wherein said means for causing said modulated beam to form a second converging beam comprises means for deviating a portion of said first converging beam, said converging lens having thus a second focal point in said second plane of convergence, and said means for causing said second uniform beam to interfere with said second coverging beam comprises means for causing said second uniform beam and said deviated portion to be coaxial.

10. The device of claim 9, wherein said means for producing second data comprises a second photoelectric detector disposed in said second plane of convergence and including a second plurality of photoelectric cells disposed on two perpendicular axes passing through said second focal point.

11. The device of claim 10 wherein said second plurality of photoelectric cells comprises a first cell disposed at said second focal point and a second and a third cell disposed each on one of said axes and both at a first distance from said second focal point.

12. The device of claim 11, wherein said second plurality of photoelectric cells further comprises a fourth and a fifth cell disposed each on one of said axes and both at a second distance from said focal point greater than said first distance.

13. The device of claim 11, wherein said means for producing second data comprises means for measuring relative phases of signals produced by said second and third cells with respect to a signal produced by said first cell.

14. The device of claim 10, wherein said second plurality of photoelectric cells comprises four cells disposed in pairs on each of said axes at a first distance on respective sides of said second focal point.

15. The device of claim 14, wherein said second plurality of photoelectric cells further comprises a fifth and a sixth cell disposed each on one of said axes at a second distance from said second focal point greater than said first distance.

16. The device of claim 14, wherein said means for producing second data comprises means for measuring relative phases of a signal produced by a cell of each pair with respect to a signal produced by another cell of said pair.

17. The device of claim 3, wherein said means for producing a first converging beam is merged with said means for producing a second converging beam, whereby said first converging beam is merged with said second converging beam, and said means for causing said second converging beam to interfere with said second uniform beam also causes said first converging beam to interfere with said second uniform beam.

18. A method for identifying an object and measuring its position and its orientation, comprising the steps of:
producing a first uniform beam of coherent light at a first frequency;
producing a modulated beam representative of shape, orientation and position of said object by spatially modulating said first uniform beam in response to said object;
causing said modulated beam to form a converging beam having a plane of convergence;
producing first data in response to luminous intensity in at least a part of said plane of convergence, whereby said first data is representative of the shape and orientation of said object;
producing a second uniform beam of coherent light at a second frequency different from said first frequency;
causing said converging beam to interfere with said second uniform beam; and
producing second data in response to variations in luminous intensity in at least a part of said plane of convergence, whereby said second data is representative of the position of said object.

* * * * *